(12) United States Patent
de La Chapelle et al.

(10) Patent No.: US 6,417,803 B1
(45) Date of Patent: Jul. 9, 2002

(54) BEAM ALIGNMENT SYSTEM AND METHOD FOR AN ANTENNA

(75) Inventors: Michael de La Chapelle, Bellevue; Christopher McLain, Seattle; David S. Parkman, Mercer Island, all of WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/825,575

(22) Filed: Apr. 3, 2001

(51) Int. Cl.[7] ................................................. H01Q 3/00
(52) U.S. Cl. ...................................... 342/359; 342/354
(58) Field of Search ................................. 342/359, 354, 342/422–427

(56) References Cited

U.S. PATENT DOCUMENTS 3,772,701 A * 11/1973 Wilkinson ................... 342/359

* cited by examiner

Primary Examiner—Thomas H. Tarcza
Assistant Examiner—Fred H. Mull
(74) Attorney, Agent, or Firm—Harness Dickey & Pierce P.L.C.

(57) ABSTRACT

An apparatus and method for correcting antenna beam misalignment between a transmit antenna and a receive antenna on a mobile platform such as an aircraft. The beam alignment method makes use of sequential lobing to determine the pointing angles in azimuth and elevation of a receive beam received by the receive antenna. For the transmit antenna, sequential lobing is used for the transmit antenna beam transmitted to a transponded satellite and then to a ground station. The ground station performs received signal strength indicator (RSSI) measurements and transmits these measurements back to the aircraft 16 via the target satellite. From these measurements, the beam misalignment between the receive and transmit antenna beams, both in azimuth and elevation, can be determined and a correction applied to the transmit antenna. The beam alignment procedure of the present invention can be implemented without interfering with normal use of the transmit and receive antennas and further ensures that interference with satellites adjacent to the target satellite will not occur during return link transmissions from the aircraft to the ground station.

22 Claims, 5 Drawing Sheets

BEAM ALIGNMENT SYSTEM AND METHOD FOR AN ANTENNA

FIELD OF THE INVENTION

The present invention relates to antenna systems for communicating with satellite based transponders, and more particularly to a beam alignment system method for correcting beam misalignment between a transmit antenna and a receive antenna, where both antennas are carried on a mobile platform and aimed at a target satellite transponder.

BACKGROUND OF THE INVENTION

Since the advent of radar during World War II, a variety of methods have been developed for tracking moving targets or tracking stationary targets from a moving platform using high gain antennas. In both cases, the pointing angles to the target change with time as the target and/or platform move. With present day satellite communication systems, the use of separate transmit and receive antennas in connection with a mobile terminal used on a mobile platform require very precise alignment between the receive and transmit beams to maintain the beams aimed as closely as possible at a target satellite. Difficulty in maintaining precise alignment between the receive and transmit beams is caused in part because of the physical separation between the antenna apertures. When the transmit antenna beam pointing direction is slaved to that of the receive antenna beam to provide two way communication with the satellite, the physical separation between the two antennas can result in beam misalignment of a sufficient magnitude to cause a degradation in system performance. Another major concern is a regulatory based concern that the beam of the transmit antenna does not interfere with other satellites adjacent the target satellite orbiting along a geosynchronous or non-geosynchronous arc.

With present day systems, the receive antenna is used to track the target satellite using a variety of well known methods such as dithering, conical scanning, monopulse, etc., and the transmit antenna is simply pointed in the direction of the target satellite as determined by the receive antenna tracking system. This is known as the "slaved" approach. A problem, however, is that there is presently no method to detect and correct for transmit/receive antenna misalignment for remote mobile terminals without removing them from service. Of course, if the misalignment becomes too large, then it is simple to detect because the transmit antenna will no longer point at the target satellite and the communication uplink to the satellite will no longer function.

With transmit and receive antennas located on a mobile platform, an alternative method of pointing the transmit antenna is simply using an "open loop" pointing approach, wherein the position and attitude of the mobile platform (gleaned from an on-board navigation system of the mobile platform) and a known position of the target satellite are used to determine the direction of pointing of the transmit antenna. The shortcoming of the open loop pointing approach is that its pointing accuracy is limited by the accuracy of the on-board navigation system. The information provided by the on-board navigation system is typically not quite accurate enough to achieve the needed pointing accuracy of the transmit antenna, which is on the order of about 0.1°. It would be very difficult or even impossible to maintain this degree of beam alignment between the transmit and receive antennas using the slaved beam approach, over the life of the system, without requiring periodic realignment of the transmit antenna. In aviation applications, the transmit and receive antennas of a satellite communications system will need to be mounted on the fuselage of an aircraft and separated typically by several feet to provide sufficient RF isolation. Antennas installed on aircraft operated by commercial airlines are expected to function for years of trouble free service with little or no costly maintenance. Under these conditions, it would be difficult or impossible to guarantee mechanical and electrical transmit/receive antenna alignment to within 0.1°.

Therefore, some form of beam alignment system is needed to correct for misalignment of a transmit antenna beam relative to a receive antenna beam when the receive and transmit antennas are used to communicate with an orbiting satellite. Such a system and method is further required which can be implemented without requiring significant additional costly and complex equipment to be carried on a mobile platform, and which can be expected to function with little or no maintenance.

SUMMARY OF THE INVENTION

The present invention is directed to a system and method for correcting for misalignment between a transmit antenna beam and a receive antenna beam of transmit and receive antennas operating on a host platform and communicating with a satellite communications system. It is anticipated that the present invention will find particular utility in connection with transmit and receive antennas carried on mobile platforms such as aircraft, however, the invention is equally applicable to a stationary host platform or to other forms of mobile platforms such as ships or moving land based vehicles.

The present invention, in one preferred embodiment, determines a beam center of the receive antenna tracking a target satellite through one of a plurality of well known methods. Once the beam center of the receive antenna is determined, the transmit antenna is pointed in accordance with pointing angles determined for the receive antenna, as described above. One of a plurality of well known methods is used to then determine a beam center of the transmit antenna as the transmit antenna transmits information to the target satellite. Sequential lobing is one preferred method which is used to determine the beam center of the transmit antenna.

A parameter of the signal quality or signal strength of the received signal at a ground station in communication with the target satellite is then measured and recorded for each one of a plurality of points in the transmit antenna sequential lobing pattern. The recorded signal strength or quality measurements are then transmitted to the host platform via the target satellite. From this information, the alignment error between the transmit and receive beams can be determined. Alternatively, this information may be used to determine the alignment error between the transmit and receive antennas on the ground. The correction can then be transmitted via the target satellite to the host platform.

It will be appreciated that the system and method of the present invention may be used with virtually any well known method for determining the antenna pointing angles to the target satellite. Sequential lobing is one preferred method. Other well known methods include beam dithering, conical scanning and monopulse tracking. The parameter measured by the receiver of the ground station and fed back to the host platform for finding the beam center of the transmit beam comprises signal strength in one preferred embodiment of the invention, but other possible parameters are signal-to-noise ratio (S/N), carrier-to-noise ratio (C/N) or energy per bit divided by noise spectral density (Eb/No).

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
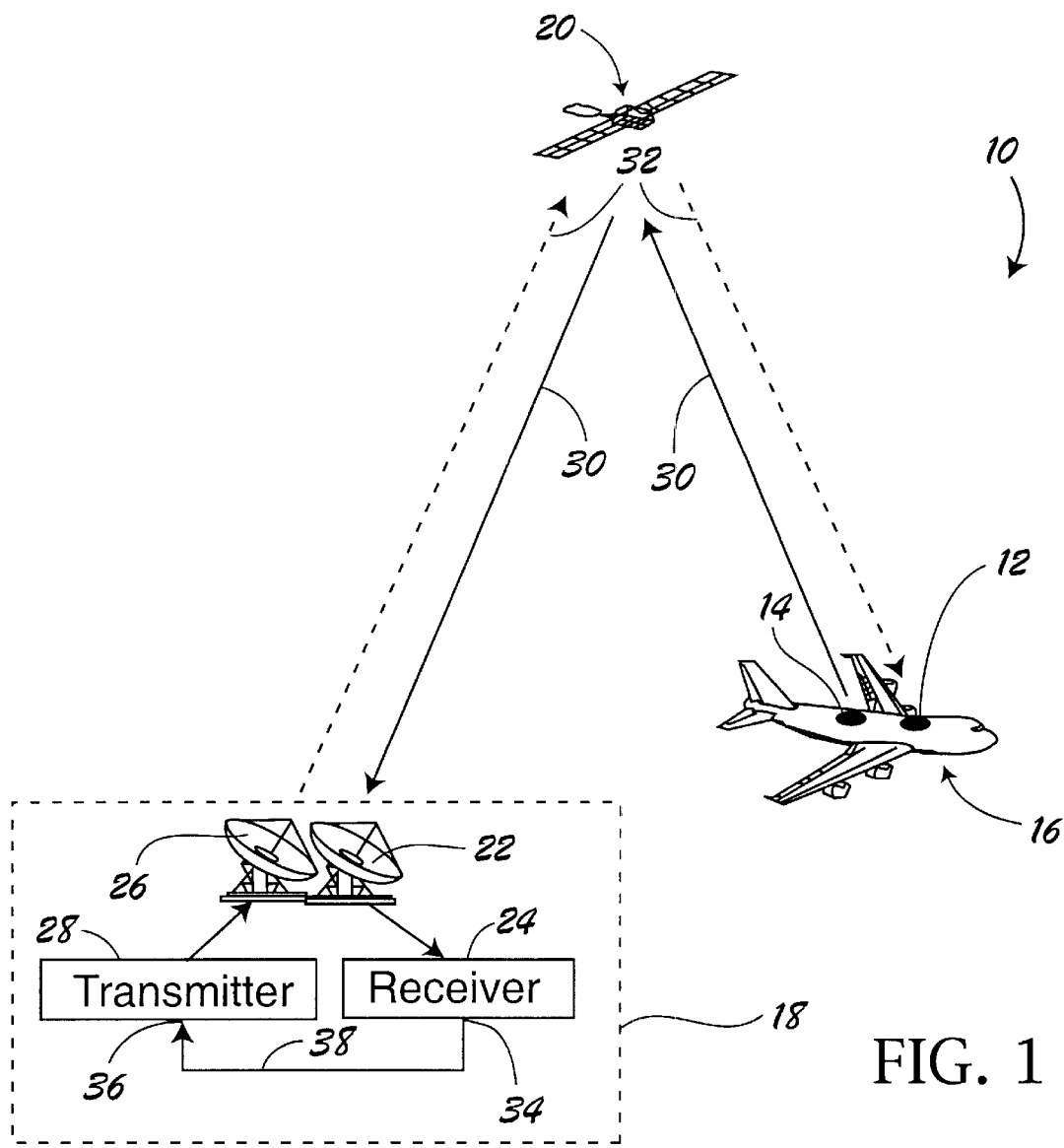
FIG. 1 is a simplified illustration of a mobile platform having a transmit antenna and a receive antenna in communication with a ground station via a target satellite having at least one radio frequency (RF) transponder, and illustrating the forward and return communications links for implementing the present invention.

Referring to FIG. 1, a system 10 is shown for correcting for beam misalignment between a receive antenna 12 and a transmit antenna 14 on a host platform 16. The antennas 12 and 14 allow the host platform 16, which is shown in this example as a mobile platform, and more particularly as an aircraft, to communicate with a ground station 18 via a transponded satellite 20. The ground station 18 includes a receive antenna 22 in communication with a receiver 24 and a transmit antenna 26 responsive to an output of a transmitter 28. Communications from the aircraft 16 to the ground station 18 are denoted by arrows 30 and will be referred to herein as "return link" transmissions. Transmissions from the ground station to the aircraft 16 will be referred to as "forward link" transmissions, and are denoted by arrows 32. It will be appreciated that while a ground station is present in the above-given description, that the use of a ground station is not essential, provided the satellite 20 includes transmit and receive modems.

The receiver 24 of the ground station 18 further includes an output 34 which is fed to an input 36 of the transmitter 28 via a feedback loop 38. Feedback loop 38 enables a received signal strength indicator (RSSI) or some other value indicative of signal quality such as energy per bit divided by noise spectral density (Eb/No), signal-to-noise (S/N) or carrier-to-noise (C/N) to be fed back by the receiver 24 to the transmitter 28 to assist in correcting for beam misalignment between the receive and transmit antennas 12 and 14, respectively.

Figure 2:
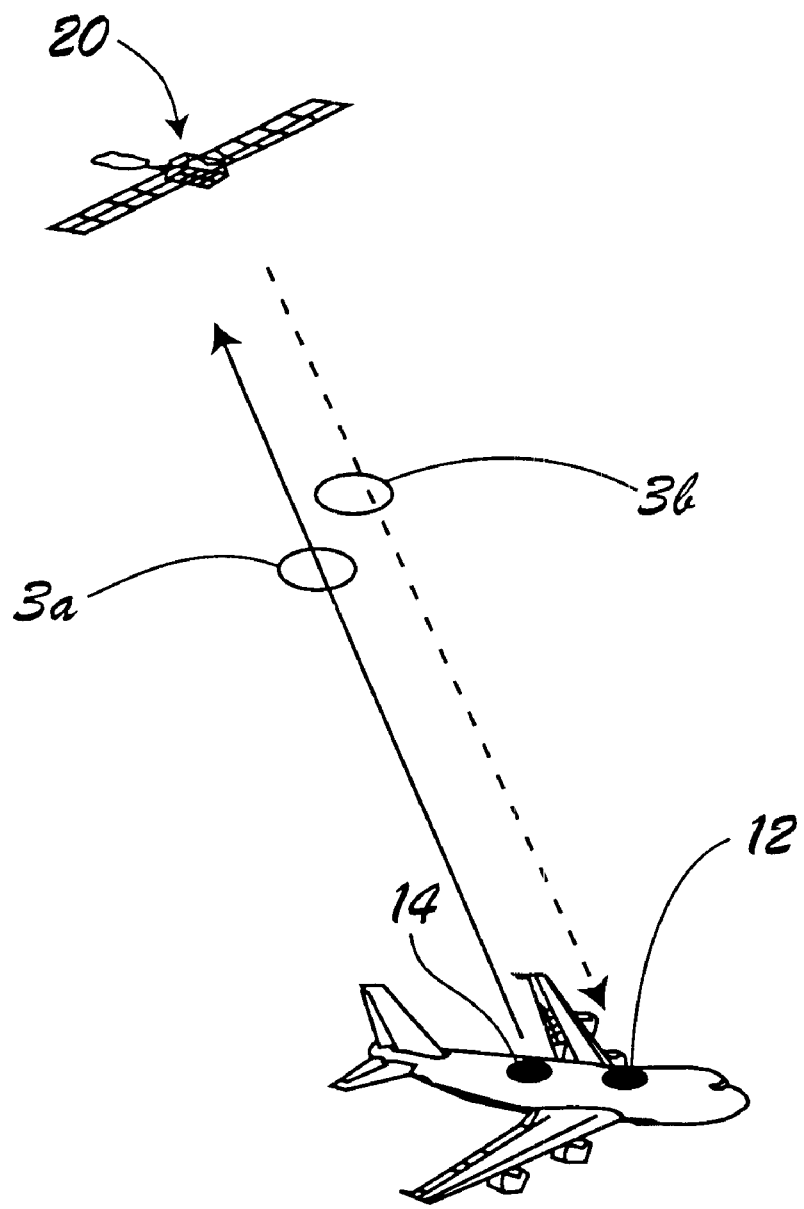
FIG. 2 is an illustration of the aircraft in two-way communication with the target satellite during the process of determining the beam centers of the transmit and receive antenna beams.
Figure 3A:
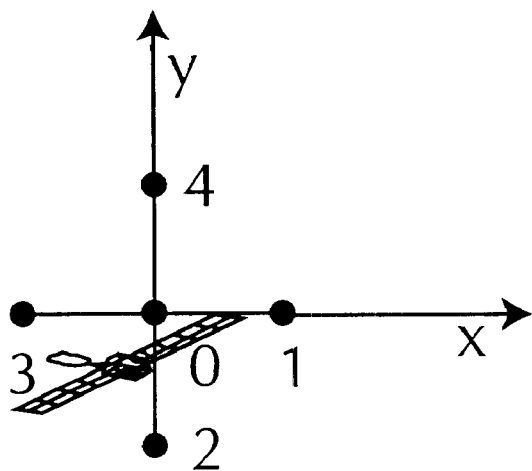
FIG. 3A illustrates the pattern of beam pointing used as part of the sequential lobing process for the receive antenna to determine the pointing angle in azimuth.
Figure 3B:
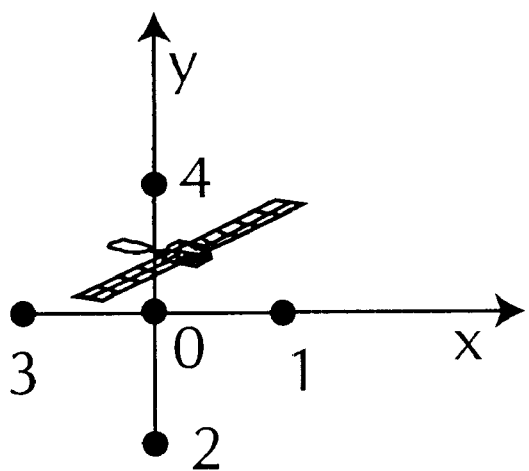
FIG. 3B illustrates the pattern of beam pointing used as part of the sequential lobing process for the receive antenna to determine the pointing angle in elevation.

Referring to FIG. 2, in operation, the system 10 and method of the present invention initially determines the center of the received antenna beam, as denoted by dashed line 36. This can be accomplished by a number of well known methods, but one preferred method is through sequential lobing. Sequential lobing works particularly well for phased array antennas because of the ability of such antennas to instantly scan to different beam pointing angles. Sequential lobing involves taking RSSI measurements in a plurality of pointing directions around the last known pointing direction to the satellite 20. This is represented in FIGS. 3A and 3B. FIG. 3B shows taking RSSI measurements in five pointing directions around the last known pointing direction to the satellite 20. These points are denoted by numerals "0", "1", "2", "3" and "4". Two points (i.e., points 1 and 3) are offset from the center point 0 in azimuth (FIG. 3A), and two points are offset from the center point in elevation (i.e., points 2 and 4 shown in FIG. 3B).

Figure 4:
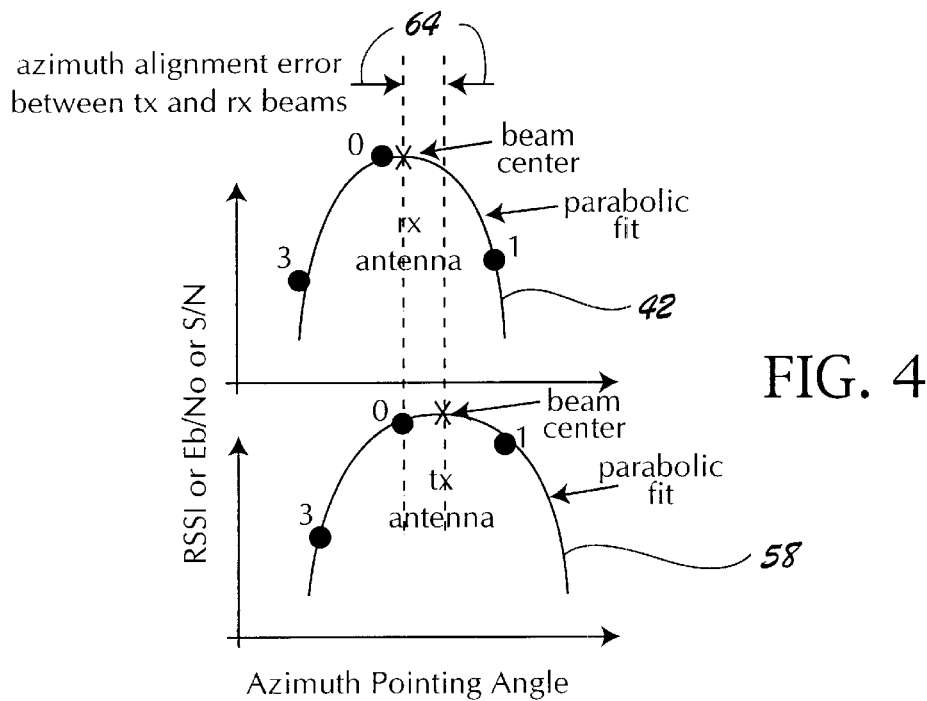
FIG. 4 illustrates the azimuth alignment error between the transmit and receive antenna beams determined from the sequential lobing process of FIG. 2.
Figure 5:
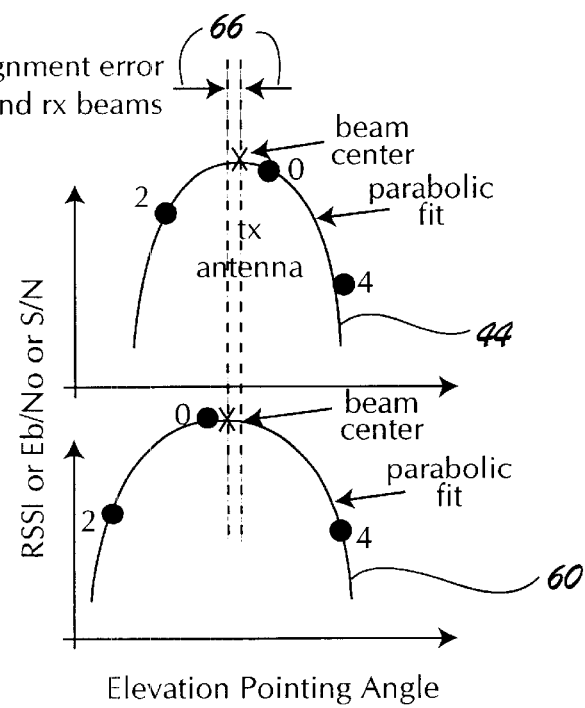
FIG. 5 illustrates the elevation alignment error between the transmit and receive antenna beams determined from the sequential lobing process and FIG. 6 is a flow chart of the steps performed in determining the alignment error between the transmit and receive antenna beams.

With brief reference to FIG. 4, a parabola 42 is fit to the three points, 0, 1 and 3 to determine the azimuth pointing angle. In FIG. 5, a parabola 44 is formed by fitting it to the three points, 0, 2 and 4 taken to determine the elevation pointing angle. The highest point on each of the parabolas 42 and 44 represents a very close estimate of the target satellite position to which the receive antenna 12 is then steered.

As described above, usually the transmit beam is steered to the satellite target position estimated by the sequential lobing of the receive beam. Put differently, the transmit beam is usually slaved to the center point of the sequential lobing pattern of the receive beam. However, slaving the pointing direction of the transmit antenna 14 to the pointing direction of the receive antenna 12 can introduce an unacceptable degree of misalignment of the transmit antenna 14. Accordingly, it will typically be required that the transmit and receive antenna beams be checked and corrected through some form of alignment or calibration process.

Figure 6:
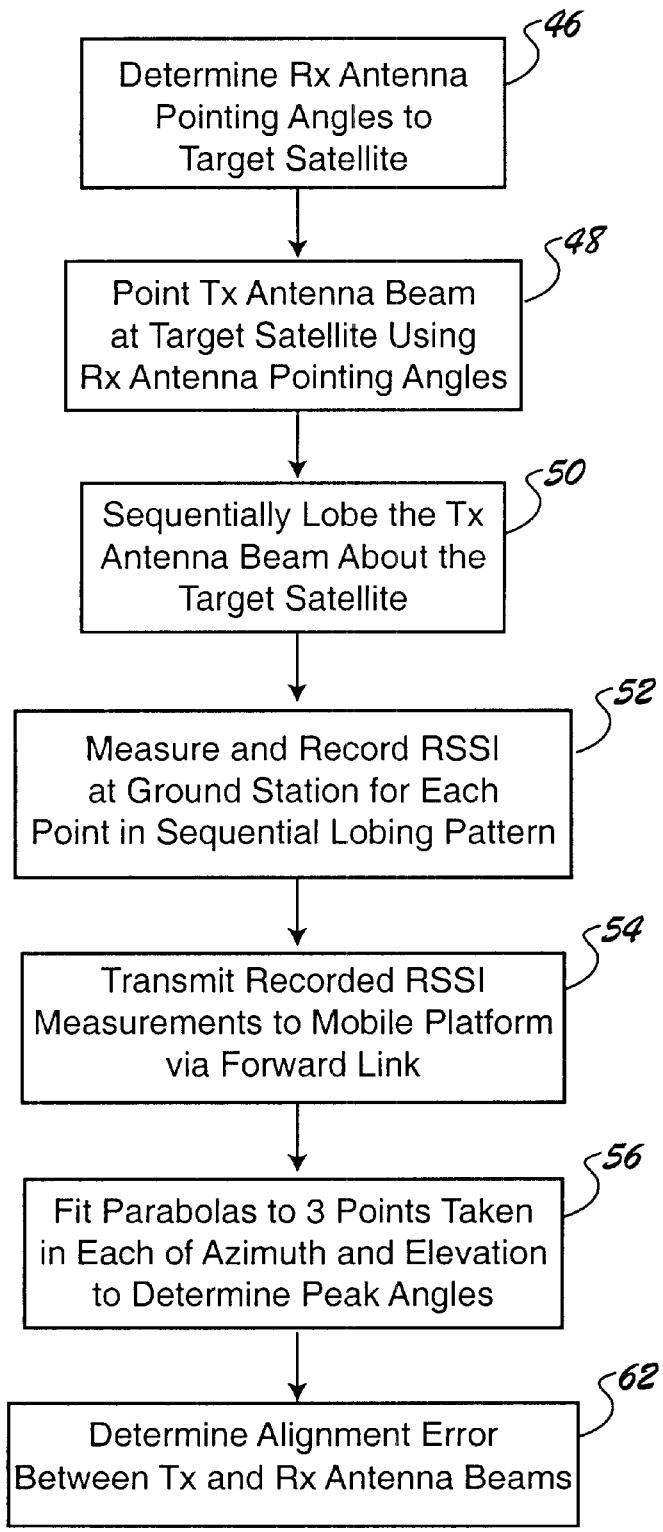

It is a principal advantage of the apparatus and method of the present invention that alignment between the transmit and receive antennas 14 and 12, respectively, can be checked and corrected quickly and without interfering with normal operation of the forward and return communication links. Referring to FIG. 6, a flowchart illustrating the steps performed by the system 10 and method of the present invention will be described. Initially, the receive antenna (Rx) 12 pointing angles to the target satellite 20 are determined, as indicated in step 46, using the sequential lobing method described above. Next the transmit antenna (Tx) beam is from transmit antenna 14 pointed at the target satellite 20, as indicated at step 48, using the pointing angles from step 46. The transmit antenna beam is then sequentially lobed about the target satellite 20 position using the sequential lobing process described in connection with the receive antenna 12, as indicated at step 50.

With further reference to FIG. 6, the RSSI at the ground station 18 is measured and recorded for each point in the transmit antenna 14 sequential lobing pattern, as indicated at step 52. It will be appreciated that a flag may need to be inserted into the return link data stream (represented by arrows 30 in FIG. 1) to indicate the transition from one lobing point to another. This flag need be nothing more than a packet of data addressed to the ground station receiver 24.

Next the recorded RSSI measurements are fed back to the transmitter 28 via feedback loop 38 and transmitted via antenna 26, the target satellite 20 and the forward links 32 to the aircraft 16, as indicated at step 54. A parabola is then fitted to the three points taken in azimuth and elevation, as indicated at step 56, to determine the peak angles of the parabola along the azimuth and elevation axes. These parabolas are indicated in FIGS. 4 and 5 and denoted by reference numerals 58 and 60, respectively. Finally, the alignment error between the transmit and receive antenna beams is determined, as indicated at step 62. With reference to FIGS. 4 and 5, this alignment error is represented by distance 64 in FIG. 4 and distance 66 in FIG. 5. Distance 64 represents the azimuth alignment error between the transmit and receive antenna beams. Distance 66 represents the elevation alignment error between the transmit and receive antenna beams. Once the azimuth and elevation alignment errors are determined, the transmit antenna 14 can be pointed even more accurately at the target satellite 20 by subtracting the alignment errors indicated in FIGS. 4 and 5 from the transmit antenna pointing angles.

Once the transmit and receive antennas 14 and 12, respectively, have been aligned, each signal quality or signal strength measurement during the transmit sequential lobing cycle described above represents a direct measure of off-axis power density. By comparing the measured off-axis power density levels to predicted levels it is possible to verify compliance with regulatory requirements.

The above-described process for determining alignment errors may be performed at system power up or at any time during normal operation of the antennas 12 and 14. The alignment calibration process does not interfere with normal operation of the communications links, does not require significant additional bandwidth to implement, and does not require significant additional equipment to be carried onboard the aircraft 16. The apparatus 10 and method of the present invention thus allows antenna misalignments to be detected and corrected for without taking the aircraft 16 out of service, which would be considered undesirable to a commercial airline operating the aircraft. The apparatus 10 and method of the present invention further eliminates the possibility of interference with adjacent satellites near the target satellite 20.

In addition to calculating alignment calibrations, the parameter measured by the ground station receiver 24 can be used to verify the system 10 off-axis power density levels, verify the host platform 16 pointing and tracking performance, and verify the transmit beam pattern.

By repeating the transmit sequential lobing cycle multiple times, it is possible to verify the host platform 16 pointing and tracking performance. The variation in computed transmit beam center between lobing cycles will be due to inaccuracies in the host platform 16 antenna pointing and tracking system. By measuring these inaccuracies, it is possible to determine whether the host platform pointing and tracking system is functioning properly.

Finally, the parabolic fit made to the transmit sequential lobing measurements represents an approximation of the transmit beam pattern. This beam pattern can be compared to the expected transmit beam pattern of the host platform to verify the proper function of the transmit antenna 14. With additional sequential lobing data points, the approximation of transmit beam pattern can be refined.

It is also recognized that adjustments may be need to be made to the host platform 16 return data rate and transmit power level to maintain signal lock during the transmit sequential lobing cycle and to meet regulatory requirements on off-axis power density. Furthermore, it will be appreciated that the ground station 18 could automatically command the host platform 16 to stop transmitting if the transmit sequential lobing process provides signals that indicate that the transmit antenna beam 14 is clearly outside of predetermined limits or parameters.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for correcting for beam misalignment of a transmit antenna relative to a receive antenna such that a beam from said transmit antenna can be more accurately directed at a target which said receive antenna is aimed at, said method comprising the steps of:

a) determining a direction relative to said target which said receive antenna should be pointed at for optimizing reception of signals from said target;

b) causing said transmit antenna to transmit signals to said target;

c) causing said target to receive said signals and to transmit information back to said receiver, said information being related to a parameter of each of said transmitted signals;

d) using said information and said direction of said receive antenna to determine an alignment error between said transmit and receive antennas relative to said target at which both are being pointed; and e) using said alignment error to more accurately point said beam of said transmit antenna at said target.

2. The method of claim 1, wherein step b) further comprises the step of causing said target to transpond said signals to a base station.

3. The method of claim 1, wherein step a) comprises determining said direction of said receive antenna by using a sequential lobing process.

4. The method of claim 1, wherein step a) comprises determining said direction of pointing of said receive antenna through a process including beam dithering.

5. The method of claim 1, wherein step a) comprises determining said direction of pointing of said receive antenna through a process including conical scanning.

6. The method of claim 1, wherein step a) comprises determining said direction of pointing of said receive antenna through a process including monopulse tracking.

7. The method of claim 1, wherein the information transmitted in step c) comprises information relating to a signal strength of said signals received by said target.

8. The method of claim 1, wherein the information transmitted in step c) comprises information relating to a carrier-to-noise (C/N) ratio of said signals received by said target.

9. The method of claim 1, wherein the information transmitted in step c) comprises information relating to an energy per bit divided by a noise spectral density (Eb/No) of said signals received by said target.

10. A method for correcting for beam misalignment of a transmit antenna relative to a receive antenna, wherein said antennas are supported on a structure adjacent one another, and wherein said antennas communicate with a satellite having a communications system and require aiming at said satellite to optimize performance thereof, said method comprising the steps of:

a) determining a direction that said receive antenna needs to be pointed at to aim said receive antenna at said satellite;

b) using said determined direction from step a) to initially point said transmit antenna at said satellite;

c) transmitting signals to said satellite from said transmit antenna to determine a beam center of said transmit antenna relative to said satellite;

d) causing said communications system of said satellite to transmit information back to said receive antenna which is indicative of a direction in which said beam center of said transmit antenna is pointing;

e) comparing said direction that said receive antenna is pointed at with said direction at which said transmit antenna is pointed at to determine a misalignment between said antennas relative to said satellite at which said antennas are pointed; and f) adjusting pointing of said transmit beam to eliminate said misalignment.

11. The method of claim 10, further comprising the steps of:

using said communication system of said satellite to relay said signals to a ground station; and using said ground station to generate said information and transmitting said information back to said satellite.

12. The method of claim 10, wherein said information comprises a signal strength of said signal transmitted from said transmit antenna.

13. The method of claim 10, wherein said information comprises a signal-to-noise ratio (S/N) of said signal transmitted from said transmit antenna.

14. The method of claim 10, wherein said information comprises a carrier-to-noise ratio (C/N) of said signal transmitted from said transmit antenna.

15. The method of claim 10, wherein said information comprises an energy per bit divided by noise spectral density (Eb/No) value of said signal transmitted from said transmit antenna.

16. The method of claim 10, wherein sequential lobing is used for determining said direction that said receive antenna is to be pointed at.

17. The method of claim 10, wherein beam dithering is used for determining said direction that said receive antenna is to be pointed at.

18. The method of claim 10, wherein conical scanning is used for determining said direction that said receive antenna is to be pointed at.

19. The method of claim 10, wherein monopulse tracking is used for determining said direction that said receive antenna is to be pointed at.

20. The method of claim 10, wherein one of beam dithering, conical scanning and monopulse tracking is used for determining said direction that said transmit antenna is pointing.

21. The method of claim 10, wherein step d) comprises transmitting information indicative of the pointing angles in azimuth and elevation of a transmit antenna beam directed at said satellite.

22. A method for correcting misalignment between a transmit antenna and a receive antenna of a mobile platform, relative to a satellite at which said antennas are pointed, and wherein the antennas are carried on the mobile platform adjacent to one another, the method comprising the steps of:

pointing said transmit antenna at said satellite in accordance with pointing information previously used to point said receive antenna at said satellite;

transmitting signals to said satellite from said transmit antenna;

analyzing said signals and supplying feedback signals from said satellite to said receive antenna indicative of the position of a beam center of a beam transmitted from said transmit antenna; and using said feedback signals to more accurately point said transmit antenna at said satellite.

* * * * *